US008694519B2

(12) United States Patent
Fein et al.

(10) Patent No.: US 8,694,519 B2
(45) Date of Patent: Apr. 8, 2014

(54) REAL ESTATE ANALYSIS SYSTEM

(75) Inventors: Gene S. Fein, Malibu, CA (US);
Edward A. Merritt, Lenox, MA (US)

(73) Assignee: Empire Technology Development, LLC, Wilmington, DE (US)

( * ) Notice: Subject to any disclaimer, the term of this patent is extended or adjusted under 35 U.S.C. 154(b) by 420 days.

(21) Appl. No.: 12/396,939

(22) Filed: Mar. 3, 2009

(65) Prior Publication Data

US 2010/0228775 A1    Sep. 9, 2010

(51) Int. Cl.
 *G06F 7/00*   (2006.01)
 *G06F 17/30*  (2006.01)

(52) U.S. Cl.
 USPC ..... 707/758; 707/706; 707/722; 707/999.003

(58) Field of Classification Search
 None
 See application file for complete search history.

(56) References Cited

U.S. PATENT DOCUMENTS

| | | | |
|---|---|---|---|
| 7,454,355 B2* | 11/2008 | Milman et al. | 705/313 |
| 7,970,684 B1* | 6/2011 | Benda | 705/36 R |
| 2002/0052814 A1* | 5/2002 | Ketterer | 705/35 |
| 2004/0128204 A1* | 7/2004 | Cihla et al. | 705/26 |
| 2005/0010423 A1* | 1/2005 | Bagbey et al. | 705/1 |
| 2009/0012803 A1* | 1/2009 | Bishop et al. | 705/1 |
| 2009/0049031 A1* | 2/2009 | Hepburn | 707/5 |
| 2009/0204531 A1* | 8/2009 | Johnson | 705/35 |
| 2010/0088234 A1* | 4/2010 | Moore et al. | 705/52 |

* cited by examiner

*Primary Examiner* — Azam Cheema
(74) *Attorney, Agent, or Firm* — Moritt Hock & Hamroff LLP; Steven S. Rubin, Esq.

(57) ABSTRACT

A real estate analysis system that provides an integrated approach for gathering available real estate data and synthesizing the real estate data for various uses by various users. The real estate data may be real time data, historical data, and/or most recent data. The processing of the data utilizes cloud resources in a cloud computing architecture. In addition, cloud resources are used to store various accumulated real estate data in a manner such that the cloud resources can quickly process calculations and have the results returned to an end user who requested the data.

24 Claims, 6 Drawing Sheets

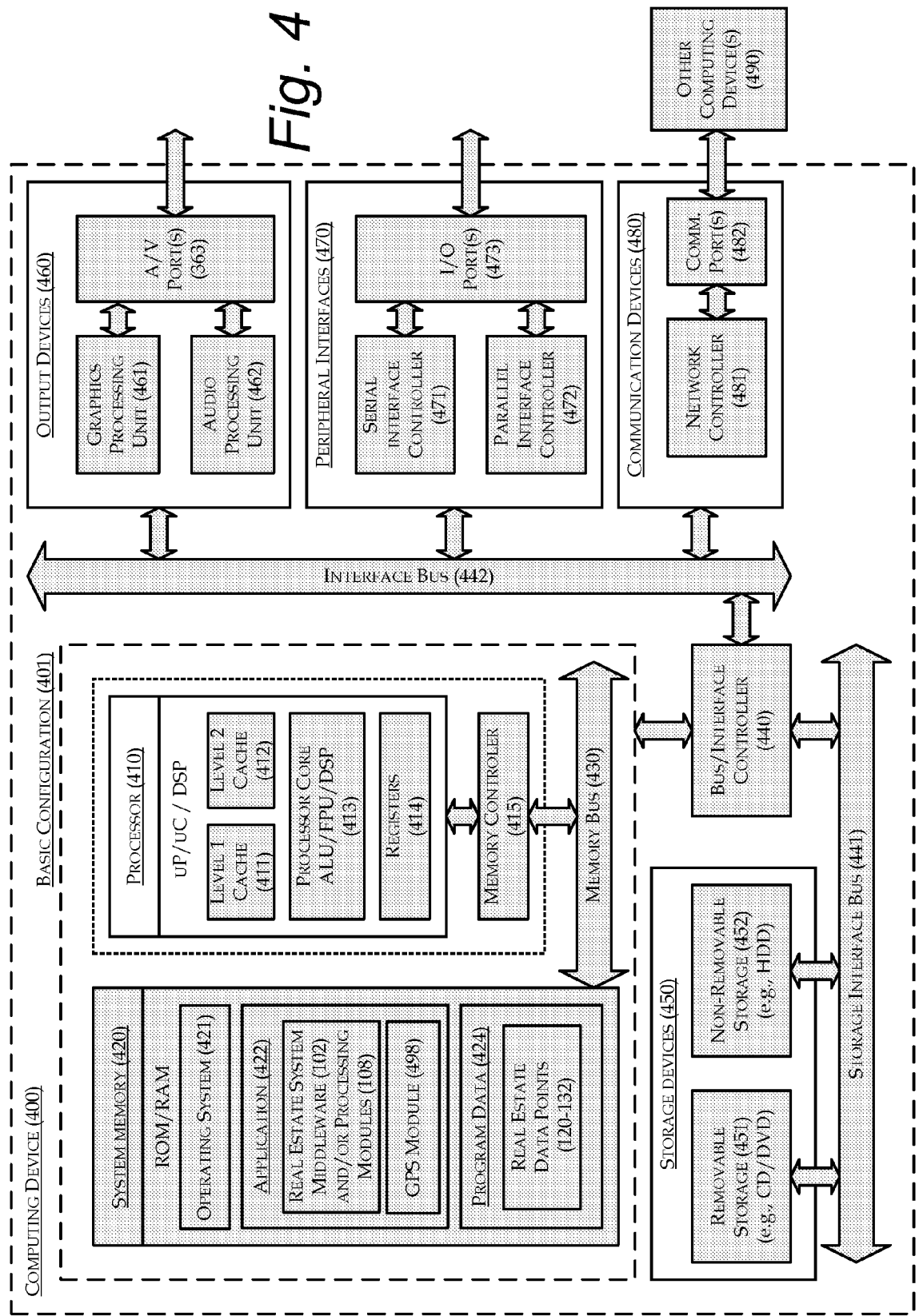

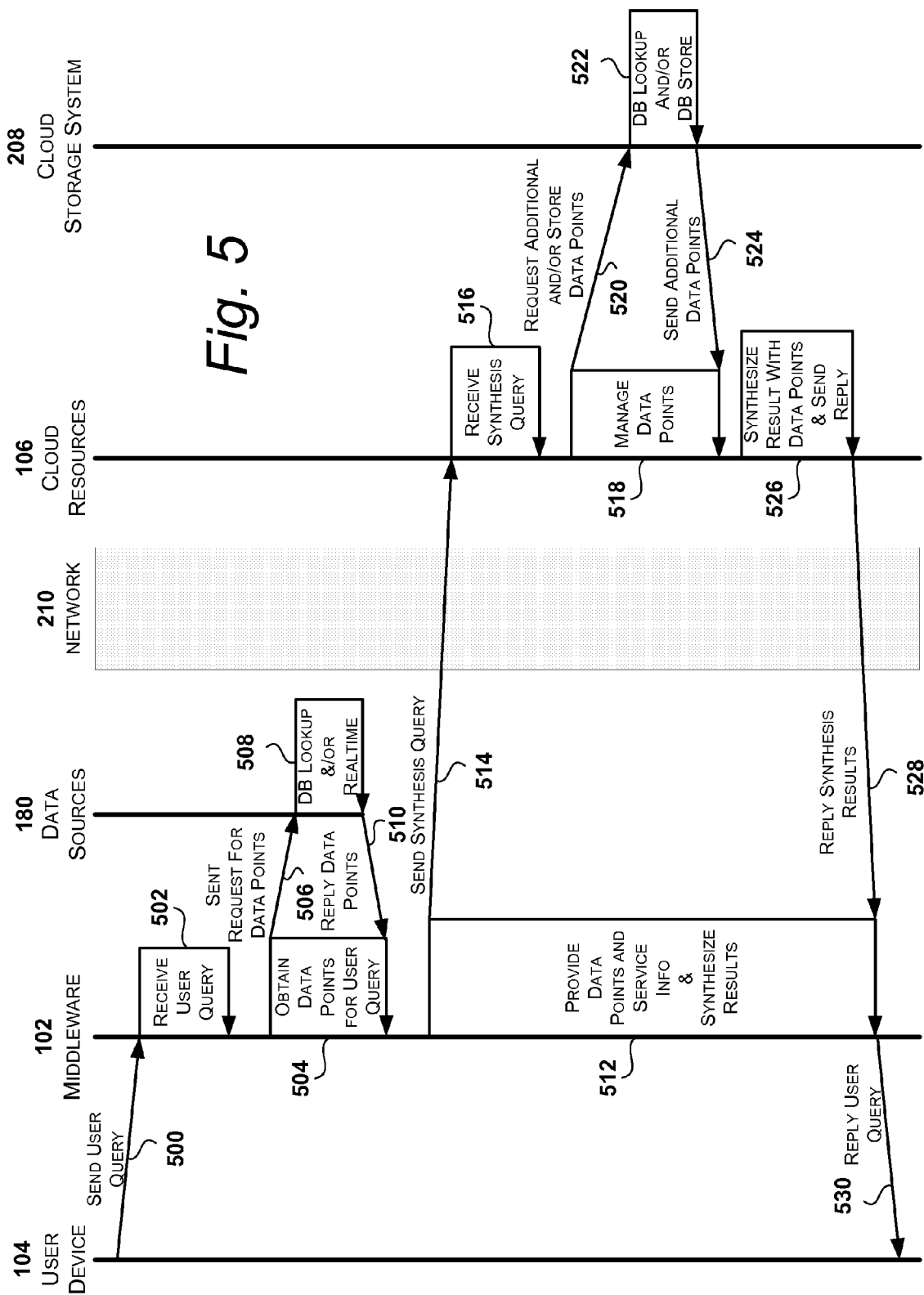

600 A COMPUTER PROGRAM PRODUCT

602 COMPUTER STORAGE MEDIA HAVING COMPUTER-EXECUTABLE INSTRUCTIONS

610 RECEIVING A QUERY FROM A USER DEVICE

612 OBTAINING DATA POINTS RELATED TO REAL ESTATE THAT ARE APPLICABLE TO THE QUERY

614 PROVIDING SERVICE INFORMATION AND DATA POINTS TO CLOUD RESOURCES IN THE CLOUD COMPUTING ARCHITECTURE THAT ARE CONFIGURED TO WORK IN CONJUNCTION WITH EACH OTHER TO ANALYZE THE DATA POINTS AND PRODUCE A RESULT THAT FULFILLS THE QUERY

616 RECEIVING THE RESULT FROM THE CLOUD RESOURCE

618 SENDING THE RESULT TO THE USER DEVICE

604 A RECORDABLE MEDIUM

606 A COMPUTER-IMPLEMENTED METHOD

*Fig. 6*

REAL ESTATE ANALYSIS SYSTEM

BACKGROUND

It is a well-known technique to use comparable sales for determining a listing price for a piece of real estate. The comparable sales information is available in one or more databases. Typically, these databases are only available to real estate agents who are members of an association of realtors or a group of associations. Collectively, these databases are referred to as a Multiple Listing Service (MLS).

Most real estate broker's websites have tools that allow potential buyers to access a limited portion of the listing information in the MLS. For example, potential buyers may view available properties based on location, type of property (single family, lease, vacant land, duplex), property features (number of bedrooms and bathrooms), and price ranges. However, once a potential buyer has identified a property on the website, the potential buyer must usually contact a listing agent or another agent to view the property.

There are also websites that provide a range of values for a home. Some of these websites use tax assessment information in addition to listing information and sales information. Typically, home values based on tax assessments are updated once a year. Home values based on sales and listing information may be updated whenever a new comparable house is sold and listed, respectively, or may be updated on a periodic basis.

While the MLS provides valuable information, the MLS does not efficiently reflect real estate trends. Real estate trends occur over time and cause a noticeable pattern or change in the general direction of the real estate industry. When the trends begin, the impact of the trends is not reflected in the MLS information and tax assessments for several months (e.g., until a sale is updated) causing a "lag" period. During this "lag" period, the MLS information does not provide sellers and purchasers accurate information for them to determine a realistic home value.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

FIG. 4 is a functional block diagram of an example computing device that may be used to implement one or more embodiments of the real estate analysis system shown in FIG. 1;

FIG. 5 is a sequential diagram illustrating interactions among several components of the real estate analysis system shown in FIG. 1; and FIG. 6 is a diagram generally illustrating a computer product configured to perform processing for the real estate analysis system shown in FIG. 1, all arranged in accordance with at least some embodiments of the present disclosure.

DETAILED DESCRIPTION

Figure 1:
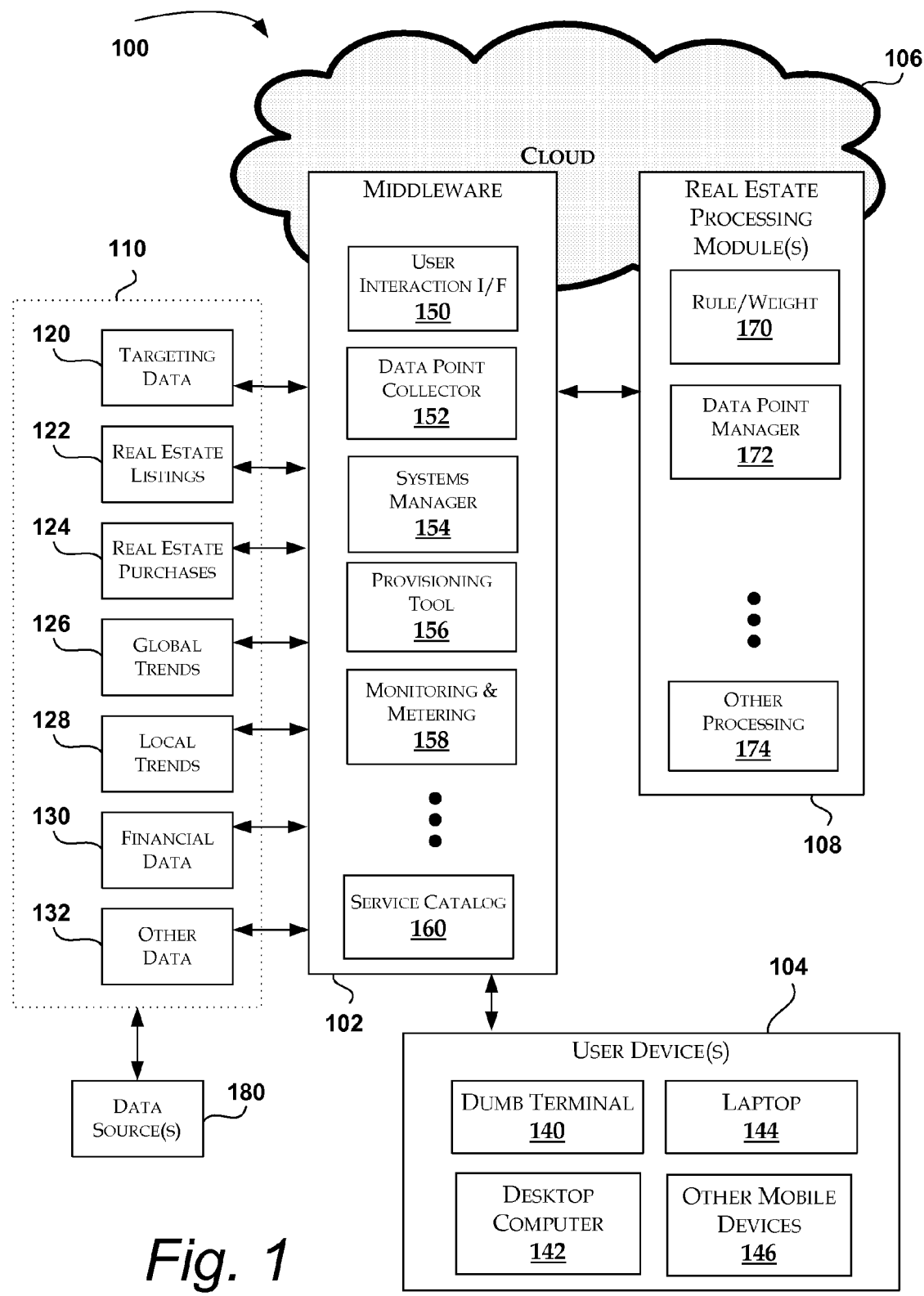
FIG. 1 is a functional block diagram generally illustrating components of a real estate analysis system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, apparatus, computer programs and systems related to a real estate analysis system. In overview, the real estate analysis system is configured to input any number of data points, which may affect the real estate market. The real estate analysis system performs processing on data points using a "cloud computing" infrastructure. The cloud computing infrastructure is configured to provide a fast evaluation of the potentially rapidly changing data points. Thus, the real estate analysis system provides real estate information that better reflects current real estate trends and incorporates real estate related news. The real estate information may include values for a piece of real estate, availability of real estate, availability of purchasers, and/or the like.

FIG. 1 is a functional block diagram generally illustrating components of a real estate analysis system 100, arranged in accordance with at least some embodiments of the present disclosure. The real estate analysis system may include one or more real estate processing modules 108, user devices 104, middleware 102, data points 120-132 (shown collectively as data point 110), data sources 180, and a cloud computing infrastructure 106 (hereinafter also referred to as the cloud).

The cloud 106 is described in greater detail below in conjunction with FIG. 2. Briefly described, cloud 106 is a cluster computing infrastructure available over a network that provides distributed parallel computing functionality. The cloud 106 includes multiple computing systems interconnected over a network to perform computing tasks collaboratively. The cloud 106 may offer vastly superior computing functionality in comparison with conventional computing devices. Cloud computing may be used to move the processing of certain applications off of many individual, independent computing devices to a centralized processing location, which simplifies the administration of those applications. In addition, the users of the many individual, independent computing devices may experience superior performance using the cloud 106 because the cloud 106 offers access to an aggregate of computing power that is superior to the local computing power of the individual, independent computing devices. Therefore, the cloud, with all its computing power, may perform intensive tasks efficiently and cost-effectively.

The user device 104 is a computing device that a user may use to interact with or perform tasks using the cloud 106. The user device is described in greater detail in conjunction with FIG. 4. Briefly described, the user device 104 may be any computing device, mobile or fixed, that interacts with the cloud 106 over a network (not shown). Several examples of the user device 104 may include one or more dumb terminals 140, desktop computers 142, laptop computers 144, or any other mobile devices 146. Because the cloud 106 performs the intense processing, it is not necessary for user device 104 to have substantial processing power or memory. Therefore, typically, user device 104 may be configured with minimal processing power and memory to help conserve battery life.

The middleware 102 may manage processing within cloud 106 and interactions with user device 104. One example implementation of an example middleware architecture is described in greater detail below in conjunction with FIG. 3. Briefly described, the middleware 102 may automatically distribute tasks among the several computing devices (not shown) in the cloud in order to fulfill requests by one or more user devices 104. For example, middleware 102 may include components that provide authentication, data transfer, response handling, and the like. Middleware 108 may be configured to provide results to a user device 104 after analysis is performed on data points 110 using resources in the cloud 106.

The example middleware 102 shown in FIG. 1 may include a user interaction interface 150, a data point collector 152, a systems manager 154, a provisioning tool 156, a monitoring and metering component 158, and a service catalog 160. Each of the middleware components 150-160 may interact with one or more of the other middleware components to fulfill a request by a user device 104. In addition, some of the middleware components 150-160 may reside within cloud 106, outside of cloud 106, or parts of the component may reside both within or outside the cloud. The user interaction interface 150 may allow a user to request a service from the service catalog 160. The request may be passed to the systems manager 154 to find the correct resources in the cloud 106. The systems manager 154 may then call the provisioning tool 156 to carve out resources in the cloud 106. The provisioning tool 156 may deploy a requested stack or web application as well. The monitoring and metering component 158 may optionally track the usage of the cloud 106 so that used resources may be attributed to a certain user device 104. Data point collector 152 may collect information related to the request from one or more data sources 180 associated with applicable data points 110. The systems manager 154 may send the collected information is to the real estate processing modules 108 for processing within cloud 106.

The one or more real estate processing modules 170-174, shown collectively as real estate processing module(s) 108, may include processing, such as rule and weight processing 170 on collected data points, data point manager 172 for obtaining and storing data points, and any other processing 174 pertinent to analyzing the data points in order to fulfill the request from user device 104. For example, other processing 174 may include custom logic that can be changed based on an importance of the data point determined by a user and/or other individual interested in the real estate market. The customizable algorithms may take into account currency changes, mortgage rates, and the like. While the real estate processing modules 170-174 are shown collectively as real estate processing module 108 in FIG. 1, one skilled in the art will appreciate that the processing modules may be distributed over multiple computing devices and portions of the processing modules may be executed on multiple computing devices. In addition, one or more real estate processing modules 170-174 or a portion of a real estate processing module may execute within cloud 106, user device 104, and/or as middleware 102.

Real estate analysis system 100 also includes one or more data points 120-132, shown collectively as data point 110. Each data point may represent data available from an associated source of data (e.g., data source 180) applicable to the real estate market. The data source 180 may be publicly available data and/or private data. Some example data sources include public agencies, courts, real estate companies, and the like. Each data point is obtained from the corresponding data source 180 via a data point collector 152 and/or a data point manager 172 if the data point is available via the cloud 106.

Data point 120 may include any targeting data. Data point 122 may include real estate listings data that show real estate that is on the market for sale. Data point 124 may include real estate purchase data such as information available on the MLS and/or in transfer of title documents available via government agencies. Data point 126 may include global trend data such as polls concerning the most desirable locations to live. Data point 128 may include local trend data such as favorable school test scores. Data point 130 may include financial data such as interest rates, currency fluctuations, and/or price of commodities such as fuel. In addition, other types of real estate data are envisioned as data points 132 in the real estate analysis system. Examples of other data points 132 may include local and national news, commission rulings and findings, demographic information, employment statistics, average income in an area, and the like. For example, a news story reporting the finding of toxic waste near an area or a natural disaster in an area will affect the market analysis for real estate in that area.

The data points 120-132 may be available from the corresponding data source 180 on a real-time basis, stored in a cloud storage system (shown in FIG. 2), and/or updated when requested. The data source 180 for each data point may push the data associated with the data point on a pre-determined interval of time or may wait for a request from the real estate analysis system to update the data. Historical data for each data point may be stored in the cloud storage system using database techniques.

Figure 2:
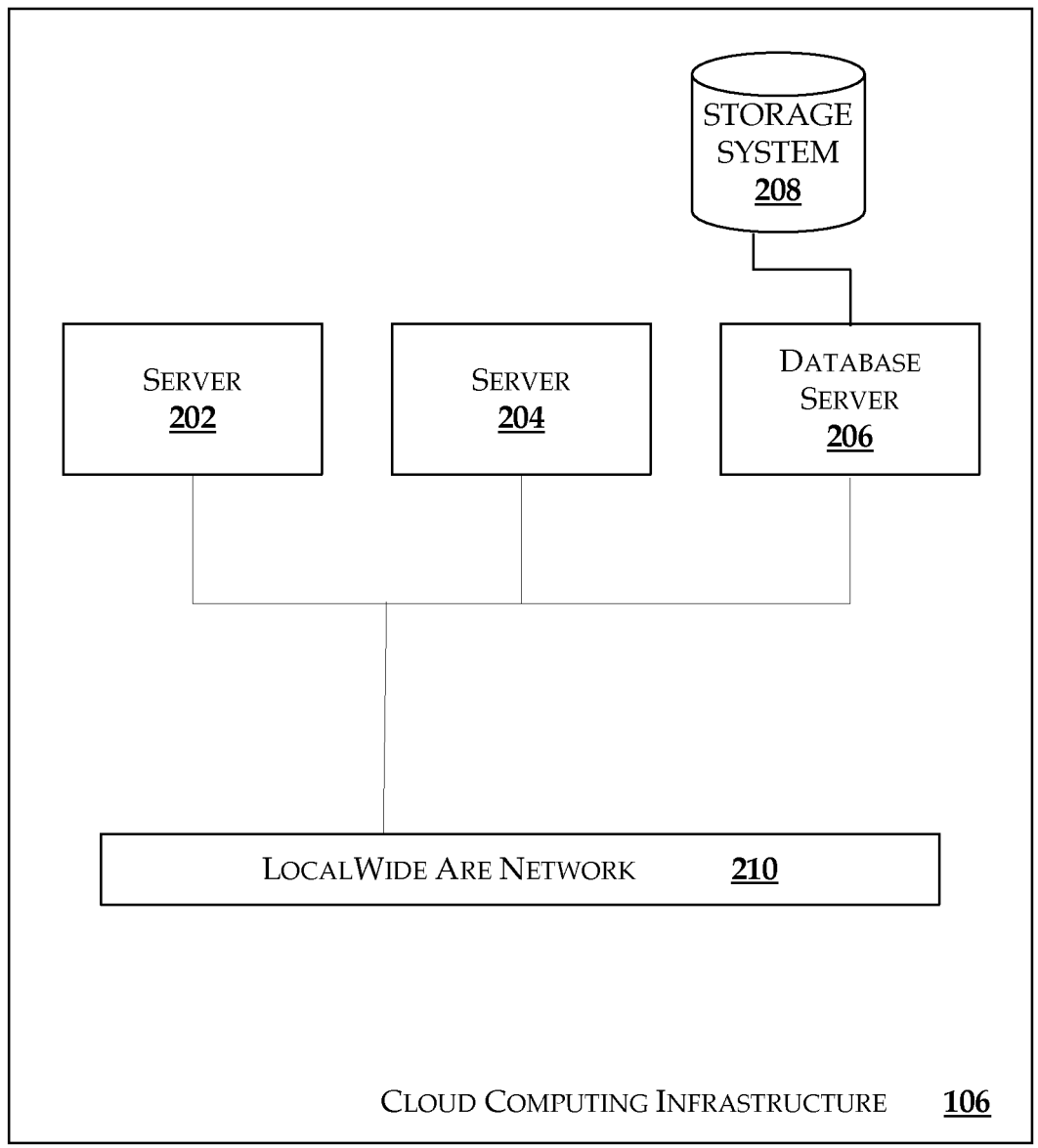
FIG. 2 is a functional block diagram illustrating in greater detail the cloud computing infrastructure introduced in conjunction with FIG. 1.

FIG. 2 is a functional block diagram illustrating in greater detail the cloud computing infrastructure (cloud 106) introduced in conjunction with FIG. 1, arranged in accordance with at least some embodiments of the present disclosure. The cloud may use one of many different cloud computing architectures. In overview, in some embodiments, the cloud computing architecture may include a massive network of "cloud servers" interconnected as if in a grid running in parallel. The cloud servers can be any variation of a computing device, an example of which is described below with reference to FIG. 4. In general, the cloud servers may provide one or more of parallel processing capabilities, archival capabilities, and storage capabilities. In the example computing environment for cloud 106, multiple interconnected computers may operate together as one logical unit, in terms of computing power, data storage, or both.

As illustrated in FIG. 2, the cloud 106 may include multiple computing devices (servers 202-206). The multiple servers may be interconnected with a local area and/or wide area network 210. One or more of the servers 202-206 may include a data storage system 208. The data storage system 208 may be maintained by a server, such as database server 206. Database server 206 may provide historical data to the real estate processing modules and may allow the real estate processing modules to store data on the data storage system 208 for later retrieval.

Figure 3:
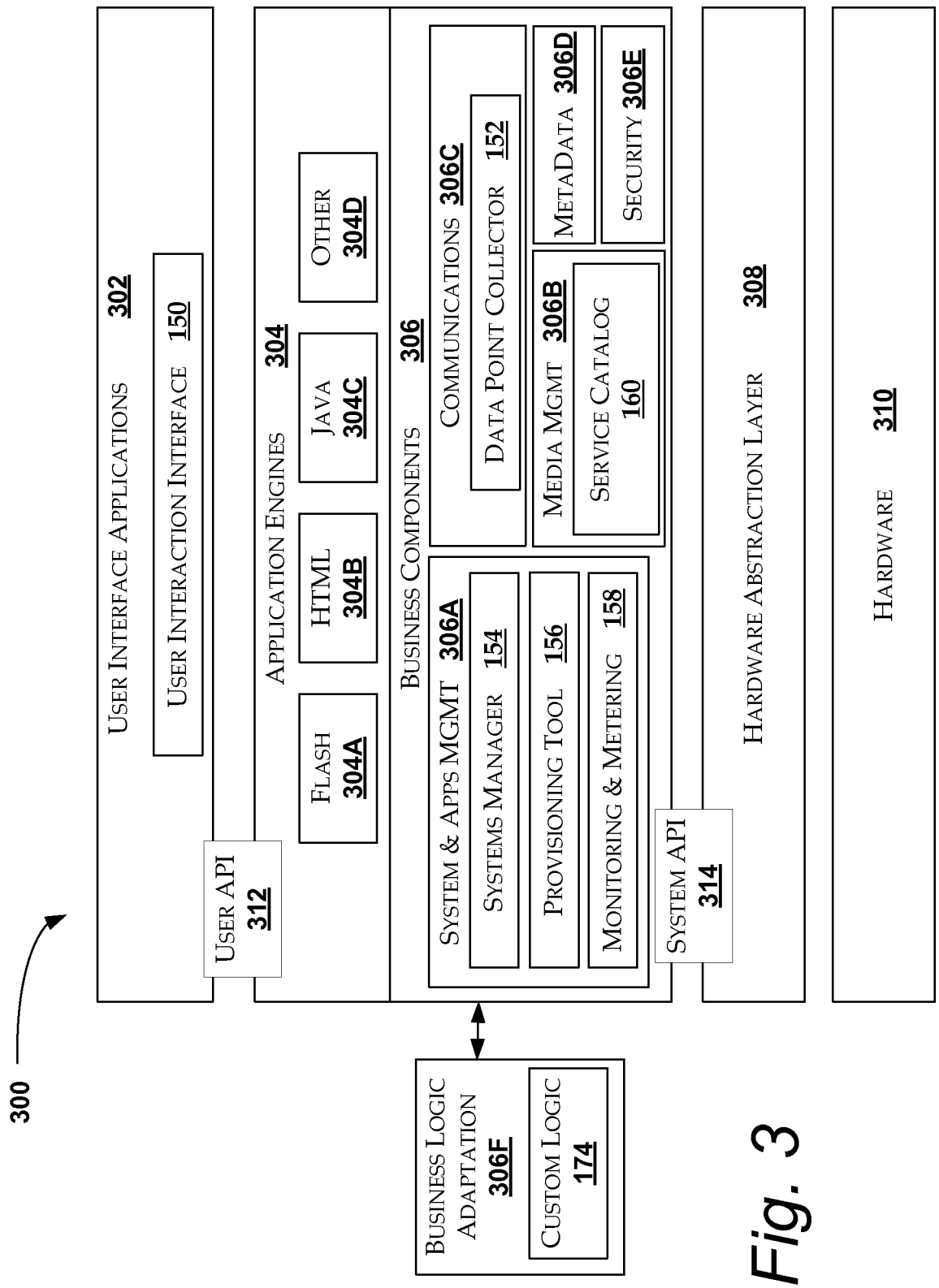
FIG. 3 is an example middleware architecture suitable for use in the real estate analysis system shown in FIG. 1.
Figure 2:
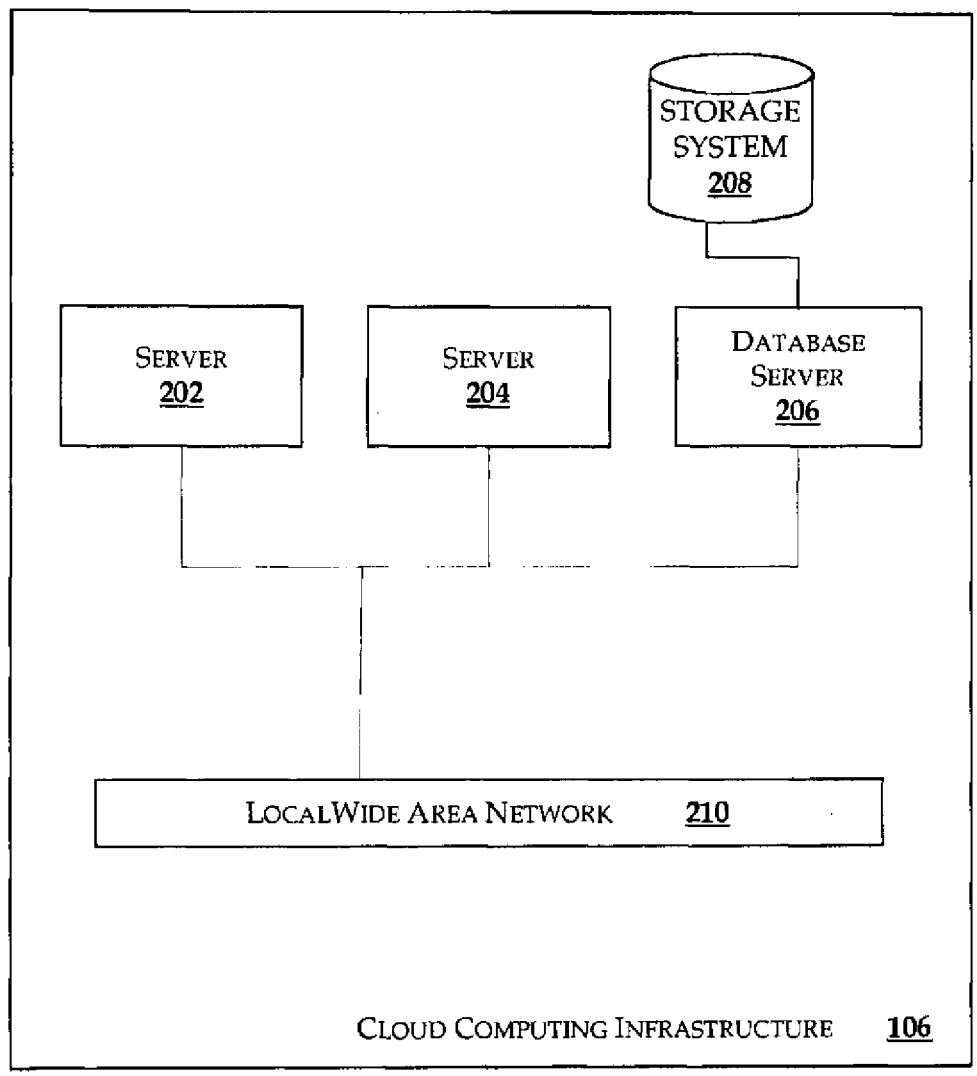

FIG. 3 is example middleware architecture 300 suitable for use in the real estate analysis system shown in FIG. 1, arranged in accordance with at least some embodiments of the present disclosure. Example middleware architecture 300 may include components such as user interface application 302, application engines 304, business components 306, a hardware abstraction layer 308, and hardware 310.

The user interface application 302 may include user interaction interface 150 for handling the interface between user device 104 and middleware 102. A user application programming interface (API) 312 may link the user interface applications 302 with the application engines 304. The application engines 304 may include multiple engine architectures, such as Flash 304A, HTML 304B, Java 304C, or other languages 304D. The business components 306 may include system and applications management 306A, media management 306B, communications 306C, metadata 306D, and security 306E and may incorporate business logic adaptation 306F. The business logic adaptation 306F may include custom logic 174 that is modifiable to account for changing trends. The system and applications management 306A may include systems manager 154, provisioning tool 156, and/or monitoring and metering 158. Communications 506C may include data point collector 152 that communicates with different data sources 180 to obtain their respective data points 110. Media management 506B may include a service catalog 160 that maintains information about different services that are available for processing by cloud 106. A system application programming interface (API) 314 may link the business components 306 with the hardware abstraction layer 308. Hardware abstraction layer 308 hides the differences in hardware 510 from the rest of the middleware components.

FIG. 4 is a functional block diagram of an example computing device 400 that may be used to implement one or more embodiments of the real estate analysis system shown in FIG. 1 in accordance with at least some embodiments of the present disclosure. Computing device may be a dumb terminal, a mobile device, a laptop device, a desktop device, a server, and other devices. For example, each server 202-206 in cloud 106 may be a computing device that may provide parallel computing for the real estate analysis system. The real estate processing modules 102 and middleware 108 may execute on one or more computing devices as computer-executable instructions. In basic configuration 401, computing device 400 typically includes one or more processors 410 and system memory 420. A memory bus 430 can be used for communicating between the processor 410 and the system memory 420.

Depending on the desired configuration, processor 410 can be of any type including but not limited to a microprocessor (µP), a microcontroller (µC), a digital signal processor (DSP), or any combination thereof. Processor 410 can include one more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the processor 410, or in some implementations the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 typically includes an operating system 421, one or more applications 422, and program data 424. Application 422 may include one or more real estate processing modules 150-156 and/or one or more middleware components 102 that are arranged in accordance with the present disclosure and that may operate on program data 424, such real estate data points 120-132 as described in conjunction with FIG. 1. In addition, application 422 may include a global positioning module 498 configured to determine a current location for computing device 400. When computing device 400 is configured as a user device 104, the global positioning module 498 may be used to specify a location of the real estate for which the user query pertains. This described basic configuration is illustrated in FIG. 4 by those components within dashed line 401.

Computing device 400 can have additional features or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 420, removable storage 451, and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which can be configured to communicate to various external devices such as a display or speakers via one or more A/V port 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which can be arranged to facilitate communications with one or more other computing devices 490 over a network communication via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

FIG. 5 is a sequential diagram illustrating interactions among several components of the real estate analysis system shown in FIG. 1, arranged in accordance with at least some embodiments of the present disclosure. The example components include user device 104, middleware 102, data sources 180, network 210, cloud resources 106, and a cloud storage system 108. In FIG. 5, and in the following figures that include various illustrative embodiments of operational flows, discussion and explanation may be provided with respect to apparatus and methods described herein, and/or with respect to other examples and contexts. The operational flows may also be executed in a variety of other contexts and environments, and or in modified versions of those described herein. In addition, although some of the operational flows are presented in sequence, the various operations may be performed in various repetitions, concurrently, and/or in other orders than those that are illustrated.

Sequence 500 illustrates sending a user query (Send User Query) from a user device 104. The user query may request a market analysis for a piece of real estate in a specified location and/or a general market analysis for real estate in the specified location. A user may enter the specified location on the user device 104. In another embodiment, the user device 104 may include a GPS module 498 that automatically determines the specified location. The specified location is then transmitted with the query. The query may be sent wirelessly using conventional wireless communication techniques, such as cellular phone communication techniques, BLUETOOTH, WI-FI, and/or may be sent using a wired network technique, such as IP-based networks.

Sequence 502 illustrates receiving the user query (Receive User Query) by middleware 102. Once the user query is received by middleware 102, at sequence 504, the middleware 102 obtains data points for the user query (Obtain Data Points for User Query). The data points are related to the specified location of the real estate and applicable to the query. Sequence 506 illustrates the middleware sending a request (Sent Request for Data Points) to one or more data sources 180 for data points. The middleware may determine which data points to retrieve based on a street address, GPS positioning data, specified city, or the like. At sequence 508, the data points may be obtained (DB Lookup &/or Realtime) from a database (DB) lookup associated with the data source 180 and/or as real time data from one or more data sources, such as a multiple listing service, a financial website, a government website, and the like. Data source 180 may maintain the data points using a mechanism and format applicable to the data source 180. For example, the financial website may provide a current interest rate pushed from the federal government and the multiple listing service may provide comparable sales located in a database. At sequence 510, the data points are sent in a reply (Reply Data Points) to middleware 102.

At sequence 512, the middleware may provide the data points and service information to cloud resources 106 that synthesize a result (Provide Data Points and Service Information & Synthesize Results). The cloud resources 106 may include servers (202-206) configured to provide parallel processing, one or more storage system 208 for storing data points, and networks 210 that allow the servers to communicate with each other. The middleware 102 may determine which cloud resources to utilize using provisioning tool 156 shown in FIG. 1. The service information may specify the services (e.g., real estate processing modules 108 shown in FIG. 1) that the cloud resources execute to obtain the result.

At sequence 514, middleware 102 may send a synthesis query (Send Synthesis Query) to the cloud resources 106 based on the outcome of the provisioning tool. At sequence 516, the specified cloud resources may receive the synthesis query (Receive Synthesis Query). At sequence 518, the specified cloud resources may determine whether additional data points are needed and whether any of the data points need to be stored using cloud resources 106 (Manage Data Points). If additional data points are needed and/or some of the data points need to be stored, at sequence 520, one or more of the specified cloud resources 106 may send a request (Request Additional and/or Store Data Points) to one or more cloud storage systems 208 for additional data points and/or storage of some of the data points. At sequence 522, one or more of the cloud storage systems 208 may perform a database lookup for the additional data points and/or one or more store operations to store the received data points (DB Lookup and/or DB Store). At sequence 524, the cloud storage system 208 may send the additional data points (Send Additional Data Points) to the specified cloud resources 106 and/or notifies the cloud resources 106 of a successful/unsuccessful storage operation.

At sequence 526, the cloud resources may synthesize a result (Synthesize Result with Data Points and Send Reply) using the data points and then may send the result (Reply Synthesis Results) via network 210 to middleware 102 at sequence 428. In some embodiments, the result may be synthesized by weighting the data points retrieved from the query to compute a weighted results. In other embodiments, a result may be synthesized using the additional data points retrieved from the cloud storage system and the data points retrieved from the query to estimate an asking price based on a combination history data and current data. Thus, the result may include past, present, and/or future real estate modeling scenarios. Stored data points, along with real time data, may be used to display chronological visual changes to real estate over time. For example, data points, such as satellite images, may show erosion of a piece of real estate over time by winds and or water. Some example queries and their respective results are provided below to help describe implementations of the real estate analysis system.

At sequence 530, middleware 102 may send the results (Reply User Query) in a reply to the user device 104 that initiated the user query. Middleware may package the result based on the type of user device that requested the user query. This allows the response to be packaged in a manner that is compatible with the user device interface.

The system described above may be used for several purposes. Some of these purposes include monitoring, analyzing, and reporting real estate information. In addition, the system may be used to model scenarios for insurance purposes, banking purposes, investing purposes, and the like. For example, the present real estate analysis system may be used to market and gauge the expense and ultimate value of developing a piece of property in a planned development or individual parcel. A user could send a query to obtain data from builders in the local area, data regarding prices of materials, data regarding other developments in the area, data regarding businesses, data regarding financing availability, data regarding potential purchasers, and the like. Based on these data points, the cloud may synthesize a result that provides a cost to build, time on market, number of potential purchasers in area that can afford the real estate and an asking price, and other useful real estate information. Because the cloud performs the processing on the data points, a significant number of data points may be considered in contrast with conventional systems. In addition, the results use updated data and not data that lags the market. Therefore, evaluations can change on a moment to moment basis based on different pieces of information.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

FIG. 6 is a diagram generally illustrating a computer product 600 configured to perform processing for the real estate analysis system shown in FIG. 1. The computer program product 600 may be one of several forms, such as a computer storage media having computer-executable instructions 602, a recordable medium 604, a computer-implemented method 606, or the like. When the computer-executable instructions are executed, a method is performed. The method may include one or more of receiving 610 a query from a user device, obtaining 612 a plurality of data points related to real estate data that are applicable to the query, providing 614 service information and the data points to a plurality of cloud resources in the cloud computing architecture that are configured to work in conjunction with each other to analyze the data points and produce a result that fulfills the query receiving 616 the results from the cloud resources and sending 618 the result to the user device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various embodiments disclosed herein are for purposes of illustration and are not intended to be limiting, with the true scope and spirit being indicated by the following claims.

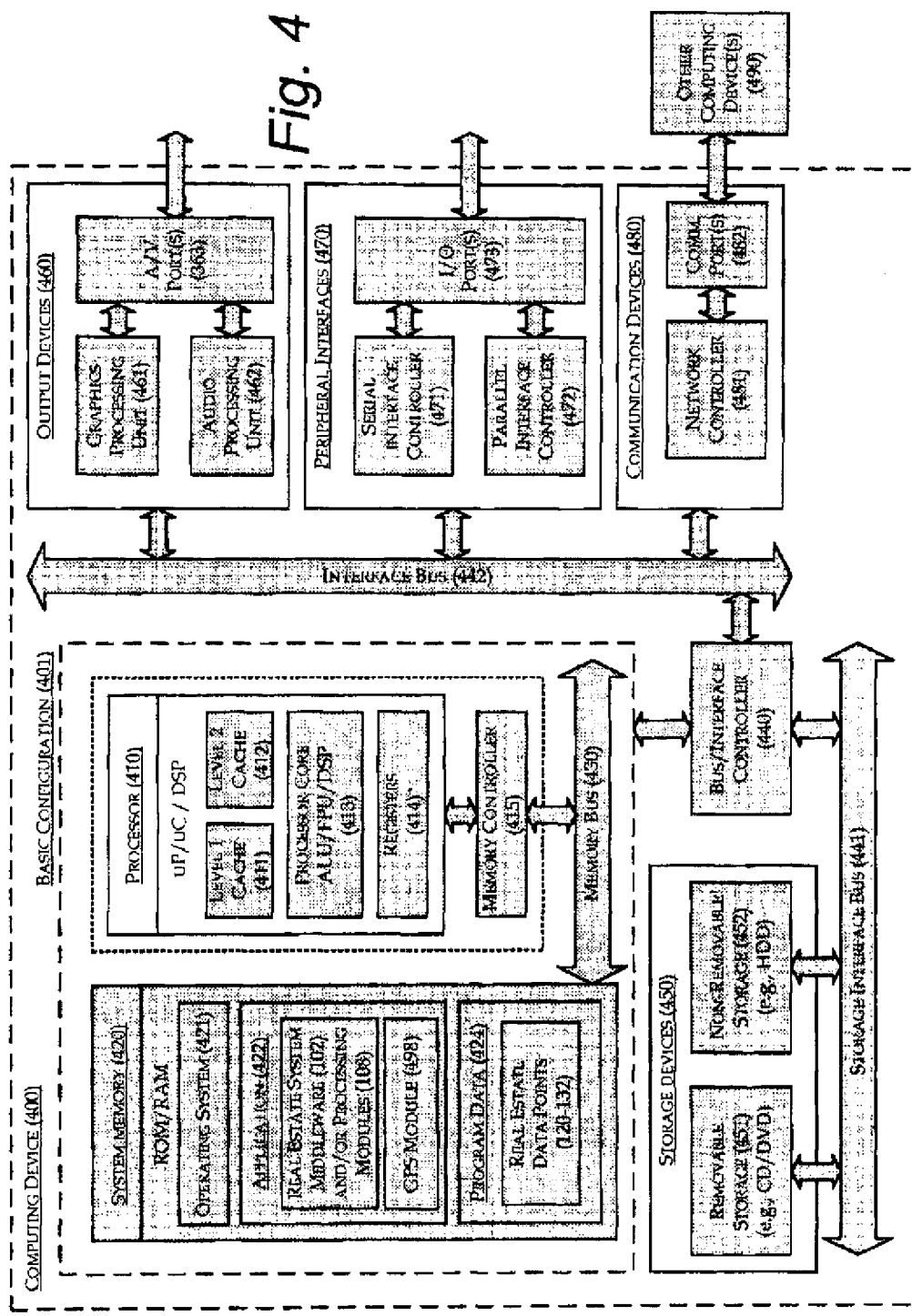

What is claimed is:

1. A computer storage media having computer-executable instructions to analyze real estate data, the computer-executable instructions, in response to execution by a processor, cause a method to be performed, the method comprising:
   obtaining two or more data points related to real estate data, wherein the data points are applicable to a query from a user device, wherein the query requests a market analysis at a specified location, and wherein the market analysis relates to either a specific market analysis for a piece of real estate in the specified location or a general market analysis for real estate in the specified location, and further wherein the market analysis relates to a cost to build, a time on a market, and a number of potential purchasers in an area that can afford the real estate at an asking price;
   providing the two or more data points to at least two cloud resources in a cloud computing architecture, the at least two cloud resources being configured to work in conjunction with each other to analyze the data points and produce a result in response
   to the query, wherein the result is related to the market analysis;
   obtaining service information from a service catalog;
   providing the service information to the at least two cloud resources, wherein the result is based on the service information obtained from the service catalog;
   determining, based on providing the two or more data points to the at least two cloud resources, whether one or more additional data points are needed to produce the result in response to the query, and in response to a determination that one or more additional data points are needed to produce the result in response to the query, obtaining the one or more additional data points related to real estate data; and
   sending the result, received from the at least two cloud resources, to the user device in a format compatible with the user device.

2. The computer storage media recited in claim 1, further comprising determining the at least two cloud resources to which the data points are provided based on utilization information about the at least two cloud resources.

3. The computer storage media recited in claim 1, wherein the two or more data points comprise at least one from a subset comprising real estate listing data, real estate purchase data, global trend data, local trend data, and financial data.

4. The computer storage media recited in claim 3, wherein the financial data includes at least one from a set comprising mortgage rates, mortgage default rates, and average household incomes.

5. The computer storage media recited in claim 1, wherein at least one of the data points is obtained by performing a database look-up on a non-cloud resource.

6. The computer storage media recited in claim 1, wherein at least one of the data points comprises a current value for the data point from an applicable website.

7. The computer storage media of claim 1, wherein the market analysis relates to an expense and value of developing the piece of real estate.

8. A computer-implemented method to analyze real estate data by a cloud resource in a cloud computing architecture, the method comprising:
   receiving a query from a user device, where the query requests a market analysis at a specified location, where the market analysis relates to either a specific market analysis for a piece of real estate in the specified location or a general market analysis for real estate in the specified location and further wherein the market analysis relates to a cost to build, a time on a market, and a number of potential purchasers in an area that can afford the real estate at an asking price;
receiving two or more data points applicable to real estate;
coordinating with at least two cloud resources in a cloud computing architecture, in conjunction with the at least two cloud resources, synthesizing a result in response to the query using the data points, wherein the result is related to the market analysis;
obtaining service information from a service catalog;
providing the service information to the at least two cloud resources, wherein the result is based on the service information obtained from the service catalog;
determining, based on providing the two or more data points to the at least two cloud resources, whether one or more additional data points are needed to produce the result in response to the query, and in response to a determination that one or more additional data points are needed to produce the result in response to the query, obtaining the one or more additional data points related to real estate data; and sending the result, received from the at least two cloud resources, to the user device in a format compatible with the user device.

9. The computer-implemented method recited in claim 8, further comprising obtaining additional data points from another cloud resource in the cloud computing architecture and synthesizing the result using the additional data points along with the two or more data points.

10. The computer-implemented method recited in claim 9, wherein obtaining additional data points comprises performing a database look-up on the other cloud resource in the cloud computing architecture.

11. The computer-implemented method recited in claim 8, further comprising storing at least one of the data points on a cloud storage system in the cloud computing architecture.

12. The computer-implemented method recited in claim 8, wherein the data points comprises at least one from a subset comprising real estate listing data, real estate purchase data, global trend data, local trend data, and financial data.

13. The computer implemented method of claim 8, wherein the market analysis relates to an expense and value of developing the piece of real estate.

14. The computer implemented method of claim 8, wherein the market analysis relates to a cost to build, a time on a market, and/or a number of potential purchasers in an area that can afford the real estate at an asking price.

15. A computing device arranged for cooperative operation with a user device and at least two cloud resources in a cloud computing architecture, the computing device comprising:
a processor;
a memory coupled to the processor and into which computer-readable instructions are loaded, the plurality of instructions arranged for execution by the processor to cause the computing device to:
obtain two or more data points related to real estate data, wherein the data points applicable to a query from the user device, wherein the query requests a market analysis at a specified location, and wherein the market analysis relates to either a specific market analysis for a piece of real estate in the specified location or a general market analysis for real estate in the specified location, and further wherein the market analysis relates to a cost to build, a time on a market, and a number of potential purchasers in an area that can afford the real estate at an asking price;
provide the two or more data points to at least two cloud resources in the cloud computing architecture, the at least two cloud resources being configured to work in conjunction with each other to analyze the data points and produce a result in response to the query, the result relating to the market analysis;
obtain service information from a service catalog;
provide the service information to the at least two cloud resources, wherein the result is based on the service information obtained from the service catalog;
determine, based on the two or more data points provided to the at least two cloud resources, whether one or more additional data points are needed to produce the result in response to the query, and in response to a determination that one or more additional data points are needed to produce the result in response to the query, obtain the one or more additional data points related to real estate data; and
send the result, received from the at least two cloud resources, to the user device in a format compatible with the user device.

16. The computing device of claim 15, wherein the computer-readable instructions are further arranged for execution by the processor to cause the computing device to determine the at least two cloud resources to which the data points are provided based on utilization information about the cloud resources.

17. The computing device of claim 15, wherein the two or more data points comprise at least one from a subset comprising real estate listing data, real estate purchase data, global trend data, local trend data, and financial data.

18. The computing device of claim 17, wherein the financial data includes at least one from a set comprising mortgage rates, mortgage default rates, and average household incomes.

19. The computing device of claim 15, wherein to obtain one of the data points, the computer-readable instructions are arranged for execution by the processor to cause the computing device to perform a database look-up on a non-cloud resource.

20. The computing device of claim 15, wherein:
the processor is further effective to receive service information, wherein the service information is obtained from a service catalog;
the processor is effective to provide the service information to the cloud resources; and
the result is based on the service information.

21. The computing device of claim 15, wherein the format is compatible with a dumb terminal.

22. The computing device of claim 15, wherein the format is compatible with a mobile device.

23. The computing device of claim 15, wherein the market analysis relates to an expense and value of developing the piece of real estate.

24. The computing device of claim 15, wherein the market analysis relates to a cost to build, a time on a market, and/or a number of potential purchasers in an area that can afford the real estate at an asking price.

* * * * *

UNITED STATES PATENT AND TRADEMARK OFFICE
CERTIFICATE OF CORRECTION

PATENT NO. : 8,694,519 B2  
APPLICATION NO. : 12/396939  
DATED : April 8, 2014  
INVENTOR(S) : Fein et al.

Page 1 of 3

It is certified that error appears in the above-identified patent and that said Letters Patent is hereby corrected as shown below:

In the Drawings

Fig. 2, Sheet 2 of 6, in Box "<u>210</u>", in Line 1, delete "ARE" and insert -- AREA --, therefor. (See attached sheet)

Fig. 4, Sheet 4 of 6, in Box "(415)", in Line 1, delete "CONTROLER" and insert -- CONTROLLER --, therefor. (See attached sheet)

In the Specification

Column 3, Line 16, delete "Middleware 108" and insert -- Middleware 102 --, therefor.

Column 4, Line 63, delete "FIG. 3 is example" and insert -- FIG. 3 is an example --, therefor.

Column 5, Line 37, delete "modules 102 and middleware 108" and insert -- modules 108 and middleware 102 --, therefor.

In the Claims

Column 12, Lines 25-26, in Claim 1, delete "to the……..analysis;" and insert the same at Line 24, after "response", as a continuation sub-point.

Column 13, Line 44, in Claim 13, delete "computer implemented" and insert -- computer-implemented --, therefor.

Column 13, Line 47, in Claim 14, delete "computer implemented" and insert -- computer-implemented --, therefor.

Signed and Sealed this  
Second Day of September, 2014

Michelle K. Lee  
*Deputy Director of the United States Patent and Trademark Office*